United States Patent
Sasaki et al.

[19]

[11] Patent Number: 6,006,089
[45] Date of Patent: Dec. 21, 1999

[54] SYSTEM AND METHOD OF MEASURING ELECTRIC FIELD STRENGTH

[75] Inventors: Kenji Sasaki; Masaaki Nagai, both of Kanagawa-ken, Japan

[73] Assignee: Leader Electronics Corp., Yokohama, Japan

[21] Appl. No.: 08/812,955

[22] Filed: Mar. 5, 1997

[30] Foreign Application Priority Data

Mar. 6, 1996 [JP] Japan ................................ 8-048938

[51] Int. Cl.$^6$ .................................................. H04Q 7/20
[52] U.S. Cl. .................... 455/423; 455/67.1; 455/456; 455/457
[58] Field of Search ................................ 455/422, 423, 455/424, 425, 427, 456, 457, 67.1; 342/126, 357, 453, 457

[56] References Cited

U.S. PATENT DOCUMENTS

| | | | |
|---|---|---|---|
| 5,023,900 | 6/1991 | Tayloe et al. | 455/424 |
| 5,095,500 | 3/1992 | Tayloe et al. | 455/424 |
| 5,121,126 | 6/1992 | Clagett | 455/456 |
| 5,218,367 | 6/1993 | Sheffer et al. | 342/457 |
| 5,465,390 | 11/1995 | Cohen | 455/423 |
| 5,602,903 | 2/1997 | LeBlanc et al. | 455/456 |
| 5,644,623 | 7/1997 | Gulledge | 455/423 |
| 5,828,962 | 10/1998 | Ho-A-Chuck | 455/423 |

FOREIGN PATENT DOCUMENTS

| | | |
|---|---|---|
| 57-35765 | 2/1982 | Japan . |
| 3-77075 | 4/1991 | Japan . |
| 8-254559 | 10/1996 | Japan . |

*Primary Examiner*—Dwayne D. Bost
*Assistant Examiner*—Nay A. Maung
*Attorney, Agent, or Firm*—Fish & Richardson P.C.

[57] ABSTRACT

A system for measuring electric field strength of radio waves transmitted from cell station and arriving at an arbitrary measuring location is provided that includes a tuner unit, cell station ID (CS-ID) demodulator unit, signal level (or electric field strength) detector (RSSI detector), memory unit, display unit, and controller (CPU). CS-ID codes included in radio waves from cell stations and transmitted to an arbitrary measuring location are detected by the demodulator unit, and electric field strength (RSSI) data of the received radio waves are detected by the RSSI detector. All sets of the CS-ID and RSSI data are stored at addresses in the memory unit corresponding to each of the measuring locations, and the stored sets of the CS-ID data and RSSI data are read from the memory unit and displayed on the display unit in association with information indicative of the measuring location.

18 Claims, 7 Drawing Sheets

SYSTEM AND METHOD OF MEASURING ELECTRIC FIELD STRENGTH

BACKGROUND OF THE INVENTION

The invention is directed to a system and method of measuring electric field strength of radio waves arriving at an arbitrary point. In particular, to a system and method of measuring and collecting electric field strength data of radio waves at an arbitrary point, which are transmitted from cell stations (CSs) of a personal handy phone system (PHS) is described.

In recent years, personal handy phone systems that improve the functionality of a digital cordless telephone system to extend its applicable area to be usable even outdoors have been put to practical use.

In the PHS, cell stations must be installed on public telephone boxes, poles, roofs of buildings, and so on, such that PHS terminals or personal stations (PSs) can be used as a simple portable telephone outdoors. In addition, such cell stations must be installed on ceilings and in underground streets to allow use of personal stations even in an underground environment. The installation of these cell station enables the personal stations to be used in radio zones, of associated cell stations, thus allowing continuous communication.

A radio zone covered by a cell station, i.e., a micro cell zone has a radius of, for example, approximately 300 meters. It is well known, however, that a range in which a call can be initiated and received is generally limited by insensitive zones due to obstructions such as buildings, and thus all micro cell zones do not generally have a uniform radius. Also, a cell station is generally allocated a limited number of channels, for example, four, so that a multiplicity of cell stations must be installed in highly frequently accessed areas such as downtown, where many PHS terminals may be used simultaneously. By doing this, the number of available channels is increased and thereby communications can be made with the PHS terminals through the channels.

In installing cell stations, detecting coverage of each cell station to reveal the state of a service area for the PHS is necessary. Conventionally, to reveal the state of a service area, an operator manually marks each measuring point on a map, writes measured electric field strength values of signals received at the measuring point, near the marked point, and analyzes the measured values to reveal the state of a service area. Consequently, the conventional measuring method entails extremely low working efficiency.

SUMMARY OF THE INVENTION

In view of the problems of the prior art mentioned above, the invention provides a method that improves the efficiency of measuring electric field strength data by employing a system comprising a combination of an electric field strength measurement apparatus, a computer system and a display.

The invention is further directed to improving the working efficiency of measuring electric field strength data in the system mentioned above, by displaying a map with marks on the display.

Finally, this invention provides an electric field strength measurement system and method that can process a collection of measured data to display and identify the number of receivable cell stations at each measuring point, a received electric field strength level from a given cell station at each measuring point, or a maximum level of received electric field strength at each measuring point in a color corresponding to each value on a displayed map, to reveal the state of a service area for a PHS visually and easily.

The present invention provides a system for measuring electric field strength of radio waves transmitted from cell stations and arriving at an arbitrary measuring location. This system uses a identification code detection unit for detecting station identification codes (CS-ID) included in respective radio waves received at a measuring location, the CS-ID codes representing cell stations which transmit the radio waves, respectively. The system further includes an electric field strength detection unit detecting electric field strength (RSSI) of the received respective radio waves.

The sets of the CS-ID data and associated RSSI data detected by the identification code detecting unit and the electric field strength detecting unit, are stored in addresses corresponding to each of the measuring locations.

A display unit for displaying on a display screen all sets of the CS-ID data and RSSI data read from the storage unit in association with information indicative of the measuring location is also present. Finally, a control unit is present in the system for controlling operation of the identification code detecting unit, the electric field strength detecting unit, the storage units, and the display unit.

The present invention also provides a method of measuring electrical field strength of radio waves transmitted from cell stations and arriving at an arbitrary measuring location. The first step consists of detecting cell station identification codes (CS-ID) included in respective radio waves received at a measuring location, the CS-ID codes representing cell stations which transmit the radio waves, respectively. A step of detecting electric field strength (RSSI) of the received respective radio waves is also present. A third step consists of storing all sets of the CS-ID data and associated RSSI data detected at each of measuring locations, in addresses corresponding to the measuring location of a storage device.

Finally, in the last step all sets of the CS-ID data and RSSI data read from the storage device are displayed on a display device in association with information indicative of the measuring location.

As mentioned above, the invention is further directed to improving the efficiency of measuring electric field strength by displaying a map with marks on the display. In the previous embodiment, the storage unit previously stored image data representing a map including the measuring location to be displayed on the display unit and the system and method can execute a measuring point plot mode. In this mode, when a measuring point is designated on the map displayed on the display unit, addresses in the storage unit corresponding to the coordinates of the designated measuring point on the map are specified, all sets of CS-ID data and RSSI data are stored at the specified addresses, and a measuring point mark is placed at the designated measuring point on the map.

The present invention is further adapted to execute a plot confirmation mode, a plot deletion mode and/or a cell station plot mode.

In the plot confirmation mode, when a measuring point is designated on the map displayed on the display unit, addresses in the storage unit corresponding to the coordinates of the designated measuring point on the map are specified to read all the sets of CS-ID data and RSSI data from the designated addresses and the sets of the read CS-ID data and RSSI data are displayed on the display unit.

In the plot deletion mode, when a measuring point is designated on the map displayed on the display unit, addresses in the storage unit corresponding to the coordinates of the designated measuring point on the map are specified to erase the CS-ID data and RSSI data stored in the storage unit and the measuring point mark on the map is deleted.

In the cell station plot mode, when a cell station is designated on the map displayed on the display unit, an address in the storage unit corresponding to the coordinates of the position of the designated cell station on the map is specified to store CS-ID code indicative of the cell station in the specified address, and a cell station mark at the position of the cell station is placed on the map.

Further, the present invention is preferably adapted to execute a communicable cell station number color display mode a particular cell station color display mode and or a maximum electric field strength color display mode.

In the communicable cell station number color display mode, addresses in the storage means corresponding to the coordinates of all the measuring points on the map on the display means are specified to read the CS-ID data stored therein, the number of the read CS-ID data for each measuring point is counted, and the measuring points on the maps are marked in colors corresponding to counted values, respectively, so as to display the numbers of communicable cell stations at the measuring points in the colors.

In the particular cell station color display mode, when the position of a cell station is designated on the map displayed on the display unit, an address in the storage unit corresponding to the coordinates of the position of the designated cell station on the map is specified to read the CS-ID data indicative of the designated cell station from the storage unit. In addition, addresses in the storage unit corresponding to the coordinates of all the measuring points on the map on the display means are specified to read the RSSI data from the storage unit. Finally, only the RSSI data paired with the read CS-ID data are extracted, and the associated measuring points on the map are marked in colors corresponding to the value of the RSSI data, so as to display the electric field strength of receivable radio waves transmitted from the designated cell station in the colors.

In the maximum electric field strength color display mode, addresses in the storage unit corresponding to the coordinates of all the measuring points on the map on the display unit are specified to read the RSSI data stored in the storage unit. A maximum value of the read RSSI data for each measuring point is detected, and the associated measuring points on the map are marked in colors corresponding to the detected maximum values, so as to display the maximum electric field strength at the measuring points in the colors.

In addition, in the present invention, the position of a measuring point or a cell station is specified on a map by clicking a corresponding position on the map displayed on the display means. Also, the display means is preferably a liquid crystal display.

The present invention is particularly useful for considering additional installation and/or deletion of PHS cell station, when it is applied to measure electric field strength of radio waves from cell stations of a personal handy phone system. However, the present invention is not limited to be used in the PHS.

Other features and advantages will become apparent from the following description, including the drawings, and from the claims.

DETAILED DESCRIPTION OF THE INVENTION

Figure 1:
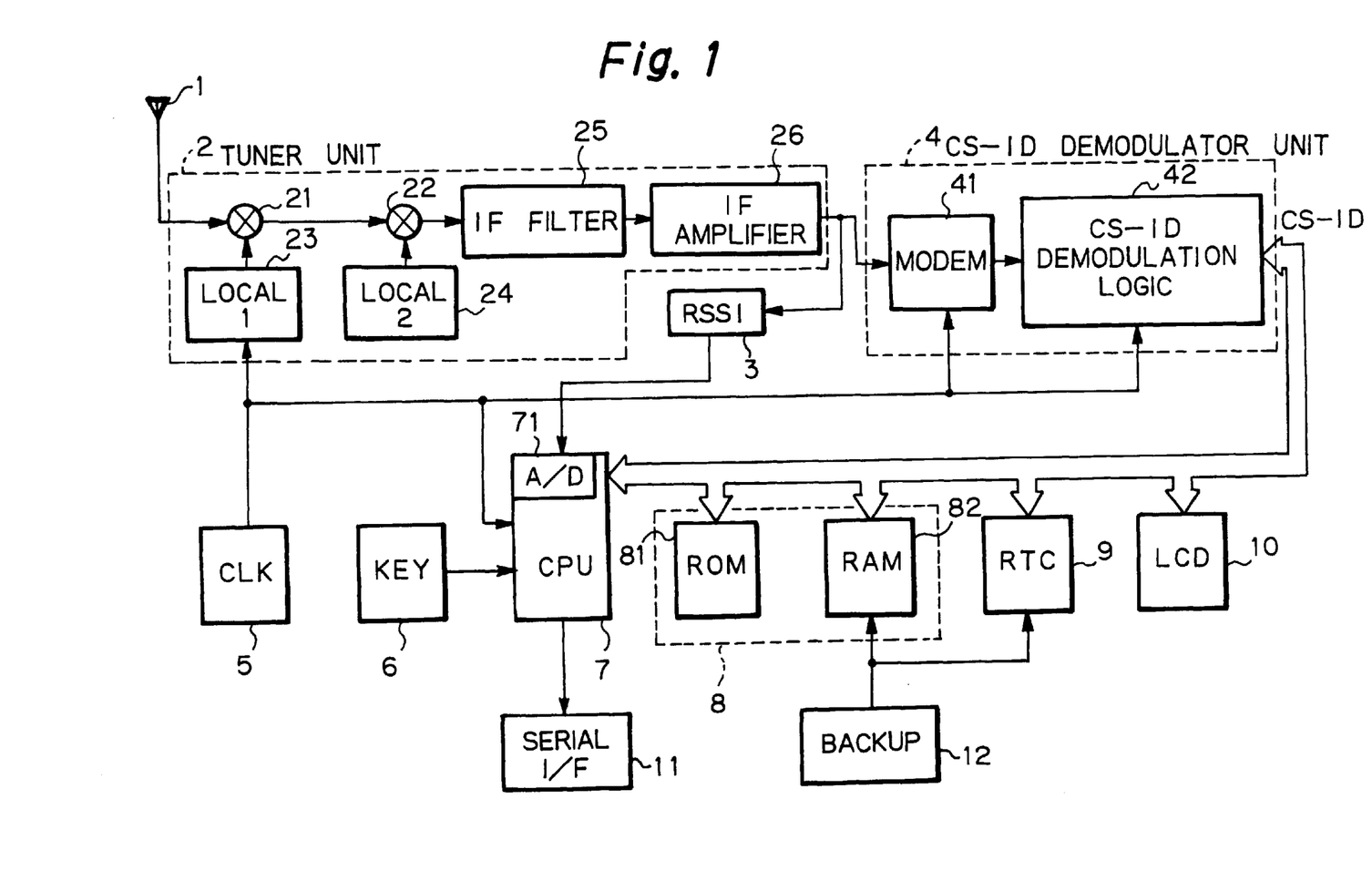
FIG. 1 is a block diagram illustrating an electric field strength measurement system according to the present invention.

Referring to FIG. 1, a system for measuring electric field strength of received signals according to the present invention is illustrated in block diagram form. The system comprises an antenna 1, a tuner unit 2, a signal level measuring detector (RSSI detector) 3, a cell station identification code (CD-ID) demodulator unit 4, a clock generator (CLK) 5 for generating a clock, a panel input key (KEY) 6, a microprocessor (CPU) 7, a memory unit 8, a timer and calendar unit (RCT) 9, a display unit (LCD) 10 comprising a liquid crystal display or the like, an external interface (SERIAL I/F) 11, and a backup power supply 12.

The tuner unit 2 comprises first and second mixers 21, 22, a local oscillator 23 (LOCAL 1), a local oscillator 24 (LOCAL 2), an IF filter 25, and an IF amplifier (limiter amplifier) 26. When signals are inputted to the tuner unit 2 through the antenna 1, the first mixer 21 mixes the input signals with the oscillation signal from the local oscillator 23 to tune a signal from a cell station, and outputs the tuned signal therefrom.

For reference, the current PHS in Japan employs carrier frequencies in a 1.9 GHz band and the carrier frequencies are set at intervals of 300 KHz. Specifically, carrier frequencies at 1895.1 MHz (carrier number 1) through 1917.95 MHz (carrier number 77) are employed. Within the range of carrier numbers 1–77, particular ones are assigned for business use, and currently, carrier numbers 12, 18, 73, 75, 77, and so on are assigned to particular PHS service companies.

A PHS of a service company assigned a carrier number (i.e., a carrier frequency) includes a plurality of cell stations, each of which is assigned a cell station identification (CS-ID) code. Each cell station intermittently transmits radio waves including the assigned CS-ID code at regular intervals TO, for example, 100 ms or the like. Also, the plurality of cell stations transmit radio waves in a time-sharing multiplex scheme.

The following description will be advanced in connection with an exemplary situation in which electric field strength of received radio waves from cell stations in a PHS mentioned above is measured at an arbitrary point.

Turning back to FIG. 1, the tuned signal from the first mixer 21 is mixed with an oscillation signal from the local oscillator 24 to be converted to an intermediate frequency signal, which is then supplied to the IF filter 25. The IF filter 25, which has a bandwidth of 300 KHz (because of the interval of carrier frequencies set to 300 KHz), supplies its output to the level measuring detector 3 through the IF amplifier 26. From the level measuring detector 3, a DC voltage representative of an amplitude level of the tuned signal is outputted. The CPU 7 includes an A/D converter 71 which converts the DC voltage from the level measuring detector 3 to level data in a digital form (or RSSI data).

The signal from the IF amplifier 26 is also supplied to a modem 41 for π/4 shift QPSK demodulation of the CD-ID demodulator unit 4, and CD-ID data included in the tuned signal is demodulated in a CS-ID demodulating logic circuit 42. The demodulated CS-ID data is supplied to the CPU 7, paired with the RSSI data from the A/D converter 71 in the CPU 7, and stored in a RAM 82 in the memory unit 8 at a predetermined address. The memory unit 8 also includes a ROM 81 which is a memory for storing programs for executing a measurement of electric field strength and so on.

Figure 2:
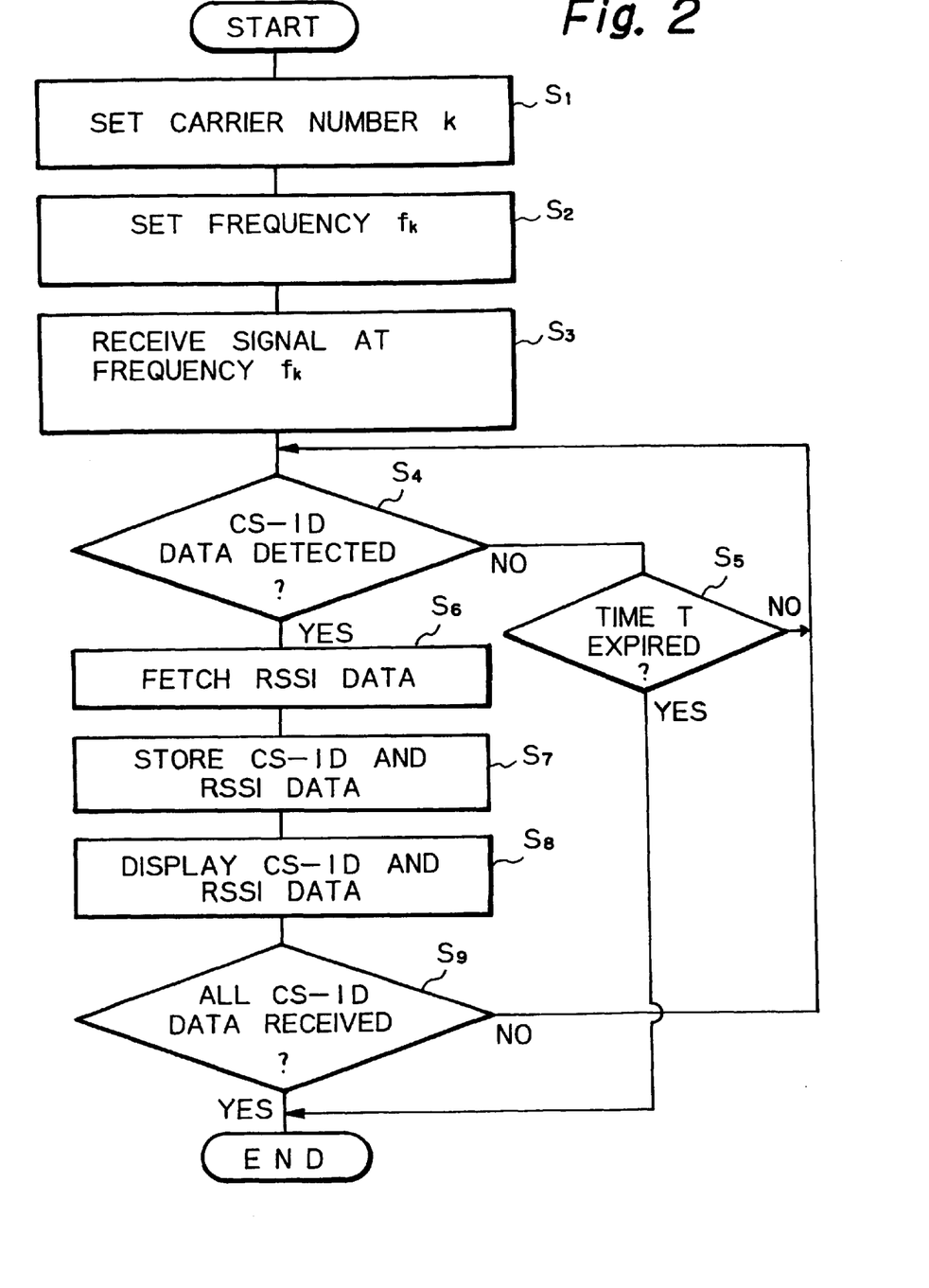
FIG. 2 is a flowchart representing a process from measuring electric field strength using the system shown in FIG. 1.

FIG. 2 shows a flowchart representing a measurement mode for measuring electric field strength of received signals using the system illustrated in FIG. 1. The operation of the measurement mode will be described with reference to the flowchart. In the measurement mode which is executed based on a program stored in the ROM 81 in the memory unit 8, the CPU 7 first specifies a carrier number k (for example, 12, 18, 73, 75, 77, or the like) within currently used carrier numbers at step S1, and sets a corresponding frequency fk under measurement at step S2. For example, if a carrier number 77 is specified, a measurement frequency f77 (=1917,95 MHz) is set. With the set of the measurement frequency, the local oscillator 23 in the tuner unit 2 is controlled to generate an oscillating signal such that a signal having the frequency fk is tuned within radio waves received by the antenna 1, by means of the local oscillator 23 and the first mixer 21 at step S3.

The tuned signal is supplied through the second mixer 22, the IF filter 25, and the IF amplifier 26 to the CS-ID modulator unit 4, where CD-ID data from the tuned signal are demodulated. Also, an output from the IF amplifier 26 is supplied to the level measuring detector 3 which generates a DC voltage corresponding to an electric field strength level of the signal at frequency fk.

The process flow next proceeds to step S4 to determine whether or not CD-ID data is detected. If CD-ID data is not detected, the detection of CD-ID data is continued until it is determined at step S5 that a predetermined time period T has expired. The predetermined time period T is set to a value equal to or more than an interval TO at which a cell station intermittently transmits radio waves. If no CS-ID data is detected even after the predetermined time period T has expired, this means that no signal at the set carrier frequency fk arrives at a current measuring point, so that the measurement mode is terminated. If it is determined at step S4 that CS-ID data is detected, the flow proceeds to step S6 where the CPU 7 fetches the DC current from the level measuring detector 3 through the A/D converter 71 to obtain digital RSSI data indicative of electric field strength of the received signal at the current time. Accordingly, the obtained RSSI data indicative of electric field strength of the received signal at the current time. Accordingly, the obtained RSSI data correspond the currently detected CS-ID data of a cell station. At step S7, the CPU 7 stores a set of the obtained RSSI and CS-ID data at a predetermined address of RAM 82 associated with the measuring point, and subsequently displays the set of the RSSI CS-ID data, in correspondence to each other, on the display unit 10 at step S8.

At step S9, it is determined whether or not all CS-ID data in the carrier frequency fk have been obtained. This determination is executed by judging whether a previously detected CS-ID data is again detected. Alternatively, it may be made by determining whether the predetermined time period T(≧TO) has expired.

A YES branch from step S9 may be returned to step S4 to repetitively execute data measurement and collection with respect to the frequency fk at a single measuring point, if necessary. In addition, if a data output request is provided from an operator through the panel input key 6 (FIG. 1) to the measurement apparatus before the measurement mode is terminated, the request is detected by the CPU 7, and responsively, measured data so far stored in the RAM 82 may be outputted through the external interface 11 to an external printer (not shown) or the like to terminate the measurement mode. Furthermore, the setting of the carrier number k at step S1 can be automatically changed among desired ones, so that measured data with respect to a plurality of carrier numbers can be automatically obtained by the measurement system.

The RAM 82 is supplied with a time signal from the timer and calendar unit 9 in order to store a time (or date and time of a measurement) signal associated with measured data. The stored time signal is read from the RAM 82 and displayed on the display unit 10 together with measured data associated therewith.

Figure 3:
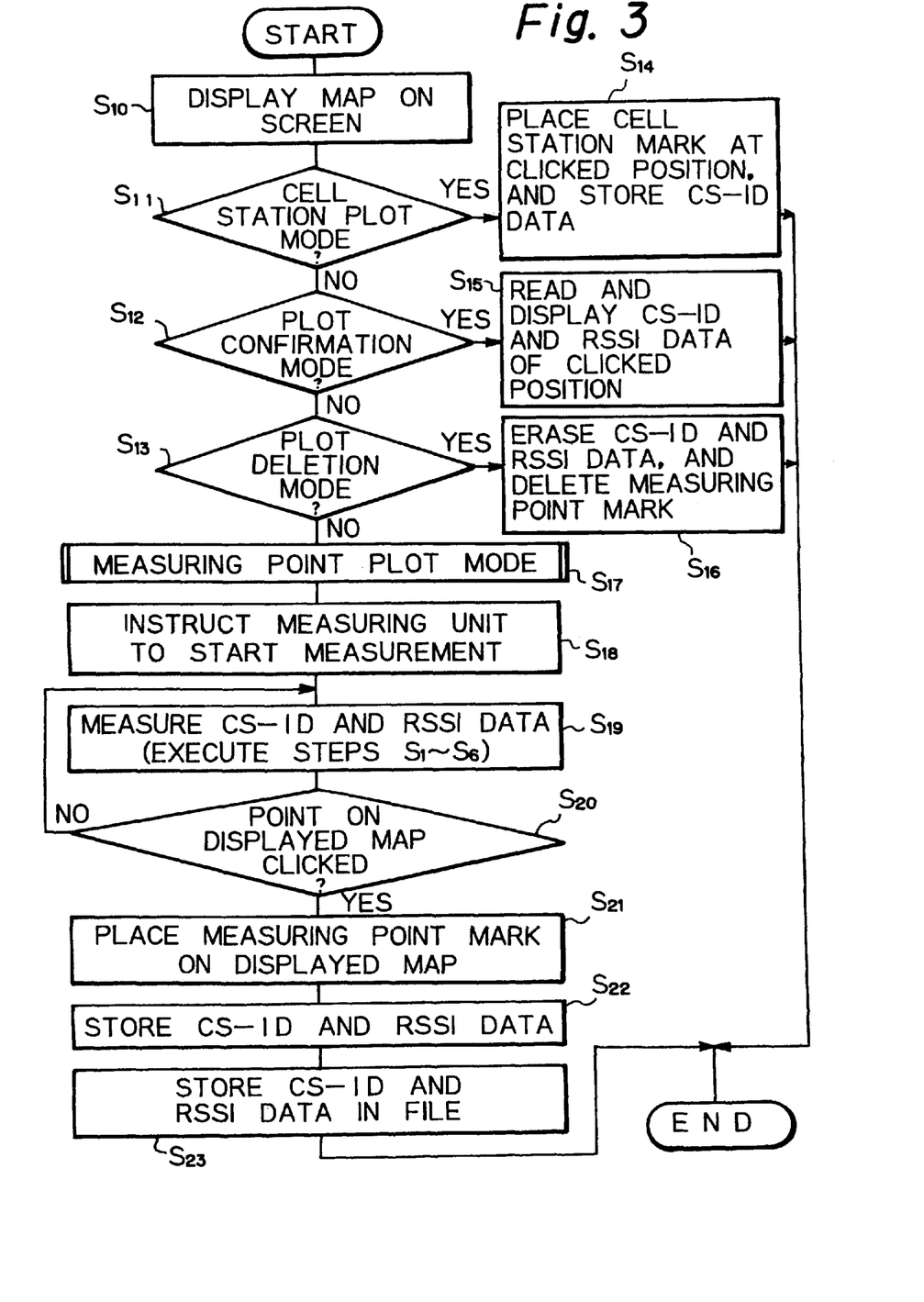
FIG. 3 is a flowchart of a process in an electric field strength measurement mode using the system shown in FIG. 1, provided that the system has a map display function.
Figure 4:
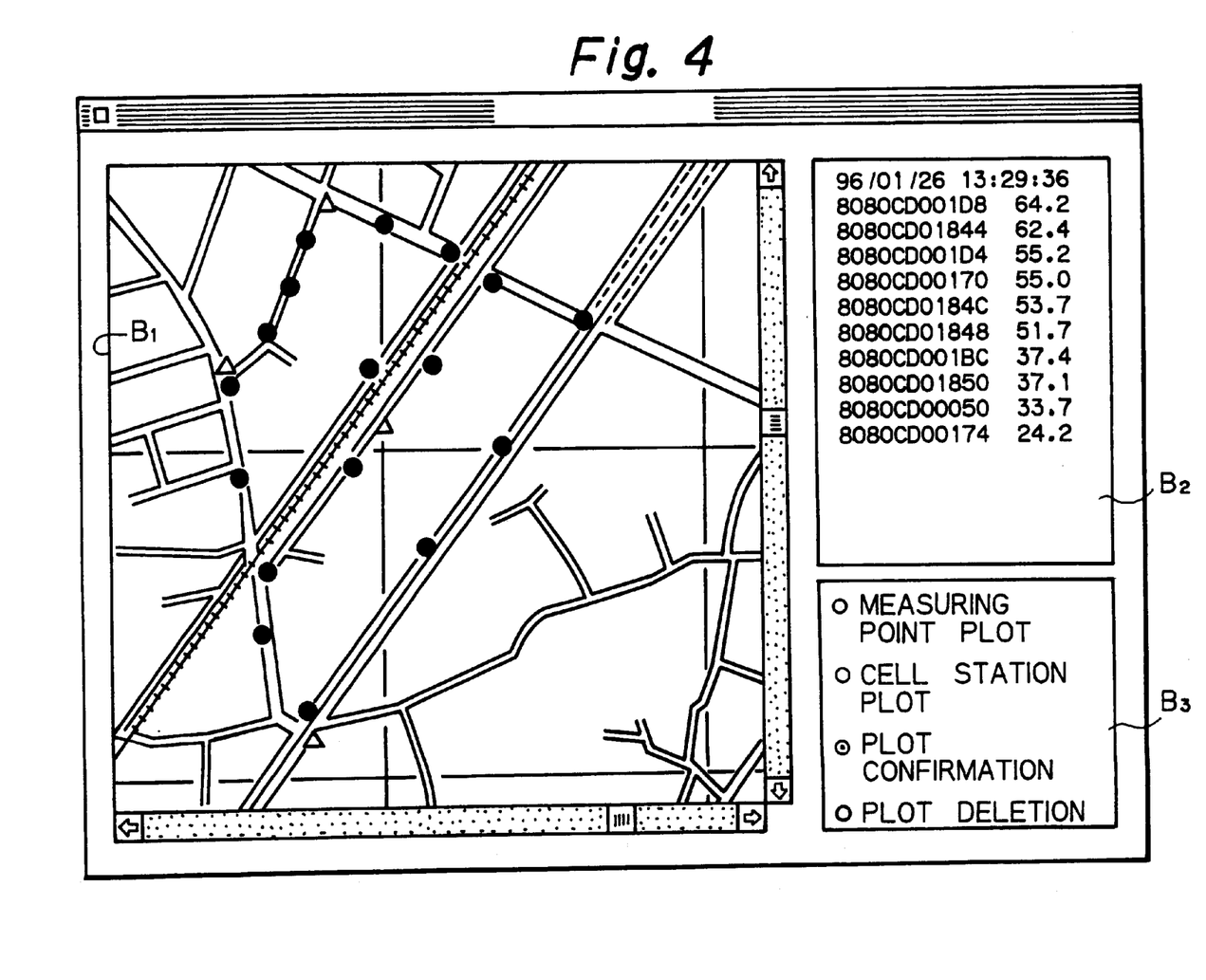
FIG. 4 illustrates an example of an image displayed on a screen of a display unit when electric field strength data are measured in accordance with the flowchart shown in FIG. 3.

The operation of the measurement mode has been particularly described above for the case where only numerical values of the measured data are displayed on the display unit 10. Next, an operation of a measurement mode with a map display function will be described below with reference to FIGS. 3 and 4. FIG. 3 shows a flowchart of a process of the measurement mode with the map display function and FIG. 4 illustrates an image displayed on the screen of the display unit 10. Map data has already been produced by scanning desired maps and stored in the ROM 81 or RAM 82 in the memory unit 8. Alternatively, map data produced by scanning may be stored in an external floppy disk (not shown) or the like and they can be read therefrom to display on the display unit 10.

The measurement mode with the map display function includes the following four modes (a)–(d):

(a) Measuring Point Plot (Data Measurement) Mode:

A measuring point mark (●) is placed at a point clicked on a displayed map on the display unit 10, and CD-ID data and RSSI data are measured and stored in the RAM 82 at addresses corresponding to the coordinates of the clicked point on the map.

(b) Cell Station Plot Mode:

A cell station mark (Δ) is placed on a point clicked on a displayed map on the display unit 10, and CS-ID data of the cell station, which is inputted by an operator through manipulations on the panel input key 6, is stored in the RAM 82 at an address corresponding to the coordinates of the clicked point on the map.

(c) Plot Confirmation Mode:

CS-ID data and RSSI data are read from addresses in the RAM 82 corresponding to the coordinates of a point clicked on a displayed map, and displayed on the display unit 10.

(d) Plot Deletion Mode:

CS-ID data and RSSI data are deleted from addresses in the RAM 82 corresponding to the coordinates of a point clicked on a displayed map, and a measuring point mark (●) at the clicked point is also deleted from the displayed map.

Referring now to FIG. 3 for explaining the operation of the measurement mode with the map display function in detail, at step S10, data of a map (map data) including a measuring point is first read from the ROM 81 and displayed in a first area or block B1 on the screen of the display unit 10, as illustrated in FIG. 4. It goes without saying that the displayed map can be scrolled in the horizontal and vertical directions on the screen. Then, the CPU 7 determines at steps S11–S13 whether a mode currently set by an operator is the cell station plot mode, the plot confirmation mode, or the plot deletion mode. The flow proceeds to the measuring point plot mode if the currently set mode is not any of the three modes.

When the cell station plot mode is set, this mode is executed at step S14 to place a cell station mark (Δ) on each clicked point on the displayed map, as illustrated in FIG. 4, and to store CS-ID data (inputted by the operator) of the cell station in the RAM 82 at an address corresponding to the coordinates of the clicked point on the displayed map.

When the plot confirmation mode is set, this mode is executed at step S15 to read stored data (CS-ID data and RSSI data) for a point clicked on the displayed map from the RAM 82, and display the data in a second area or block B2 (see FIG. 4) on the display unit 10. In this event, the cell station point on the displayed map having CS-ID data equal to the read one may be colored in accordance with the value of the associated read RSSI data. In the second block B2 illustrated in FIG. 4, the date and time at which a measurement is made are displayed on the top, and the read RSSI data and CS-ID data are displayed below the date and time in the block B2. The date and time information has been stored in the RAM 82, together with the CS-ID and RSSI data when the measurement is practiced. How to store the measured data in the RAM 82 will be described later in connection with the measuring point plot mode.

When the plot deletion mode is set, this mode is executed at step S16 to erase stored data regarding a clicked point having a measuring point mark (●) on the displayed map from the RAM 82 and the measuring point mark at the clicked point from the displayed map.

When any of the cell station plot mode, the plot confirmation mode, and the plot deletion mode is not currently set, the CPU 7 determines that the currently set mode is the measuring point plot mode and executed the processing at and subsequent to step S17, In the measuring point plot mode, the measuring section, i.e., the tuner unit 2, the level measuring detector 3, and the CS-ID demodulator unit 4 are instructed to start a measuring operation at step S18, whereby the measurement flow as explained in connection with FIG. 2 is started. In this event, the process comprising steps S1–S6 in FIG. 3 is executed at step S19 to detect CS-ID data and RSSI data of signals received at the current location on the earth, and it is determined at step S20 whether or not a point is clicked on the displayed map. If no point is clicked, the flow returns to step S19 to repeat this step, In other words, the measuring unit measures the CS-ID data and RSSI data, and if necessary, it measures them while scanning or renewing channel frequencies.

When the operator clicks a point on the displayed map representing the current measuring location, the flow proceeds from step S20 to step S21 where a measuring point mark (●) is placed at the clicked point on the displayed map. Then, the flow proceeeds to step S22, where the measured data (i.e., RSSI data and CS-ID data) are stored in the RAM 82, At step S7 in FIG. 2, such measured data are stored in the RAM 82 in relation to position data of a measuring point inputted by the operator. However, in the measuring point plot mode, the measured data are automatically stored in the RAM 82 at addresses corresponded to the coordinates of the clicked point on the displayed map.

Next, the flow proceeds from step S22 to step S23, where the measured data are stored in a file as required, followed by the termination of the measurement mode with the map display mode.

A third area or block B3 below the second block B2 on the screen illustrated in FIG. 4, is a portion for displaying a menu for prompting the operator to select one from the aforementioned four modes (a)–(d) in which the system is to be operated.

Next, a color display mode according to the present invention will be described with reference to FIGS. 5–7. In the color display mode, the measured data stored in the RAM 82 as described above are analyzed to display the state of a service area on the screen of the display unit 10 in a readily understandable fashion using coloring. The color display mode includes the following three modes:

(A) Communicable Cell Station Number Color Display Mode

The number of receivable or communicable cell stations, which includes zero, is displayed at each of all measuring points on the displayed map in a color corresponding to the number.

(B) Particular Cell Station Color Display Mode

Electric field strength of radio waves from a specified cell station is displayed on the displayed map in a color corresponding to the level of the electric field strength or RSSI, which includes zero, at each of all measuring points.

(C) Maximum Electric Field Strength Color Display Mode

A maximum value of electric field strength or RSSI at all measuring points is displayed on the displayed map in a color corresponding to the level of the RSSI, which includes zero.

Figure 5:
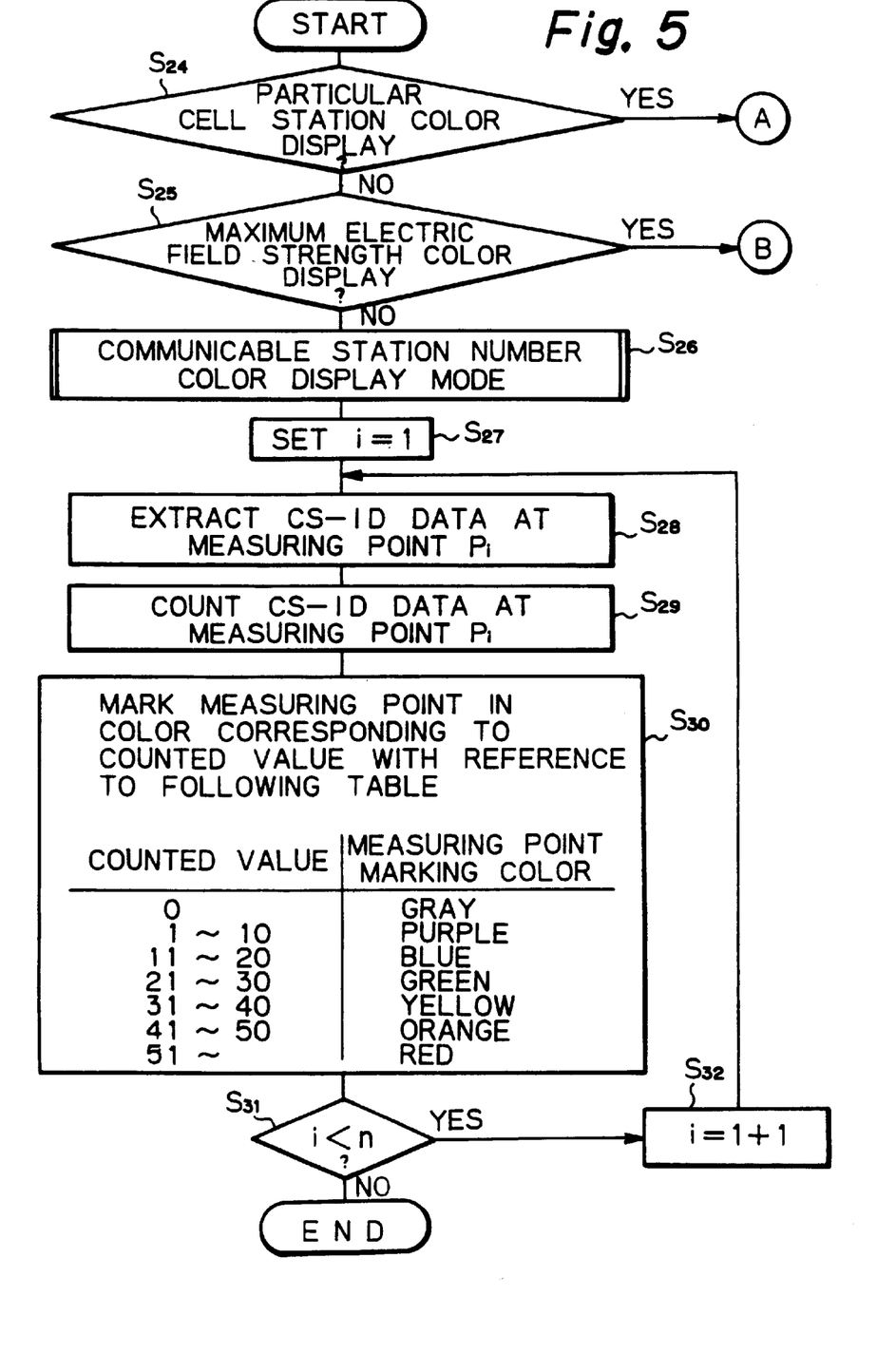
FIG. 5 is a flowchart of a process in a receivable station number color display mode which is executed after electric field strength data have been measured in accordance with the flowchart shown in FIG. 3.

Referring to FIG. 5, when the measuring point color display operation is started it is determined at steps S24 and S25 whether a current mode is the particular cell station color display mode or the maximum field strength color display mode. If it is determined that the current mode is not either of them, the receivable station number color display mode is executed at and subsequent to step S26. For executing this mode, the CPU 7 sets i to one (i=1) at step S27, and reads from the RAM 82 measured data at a measuring point Pl from all measuring points Pi (i=1,2, . . . , n) at which measurements have been made.

Then, at step S29, CS-ID data in the read measured data are counted to see how many CS-ID data are included in the read measured data. Accordingly, the number of cell stations transmitting radio waves which can be received at the measuring point Pl is detected. At step S30, the measuring point Pl on a displayed map is marked in a color set in accordance with the count value. The number of communicable cell stations, which include zero and the color to be marked correspond as illustrated in a table shown in the block of step S30, for instance. This table has been previously stored in the ROM 81 (or the RAM 82) such that the CPU 7 refers to the table to place a color mark on an associated measuring point. For example, when the number relating to the point Pl is 10, purple is marked at the point Pl on the displayed map.

Next, the flow proceeds to step S31, where it is determined whether or not data at all the measuring point have been read, i.e., it is determined whether or not i<n is satisfied. If i is smaller than n, i is incremented by one (i=i+1) at step S32, followed by returning to step S28, where measured data at a next measuring point P2 is read, Similarly, the measuring point P2 on the displayed map is colored corresponding to the number of communicable cell stations.

The processing as described above is repeated until it is determined at step S31 that i is not smaller than n, i.e., i=n is satisfied, followed by the termination of the communicable cell station number color display mode.

Figure 6:
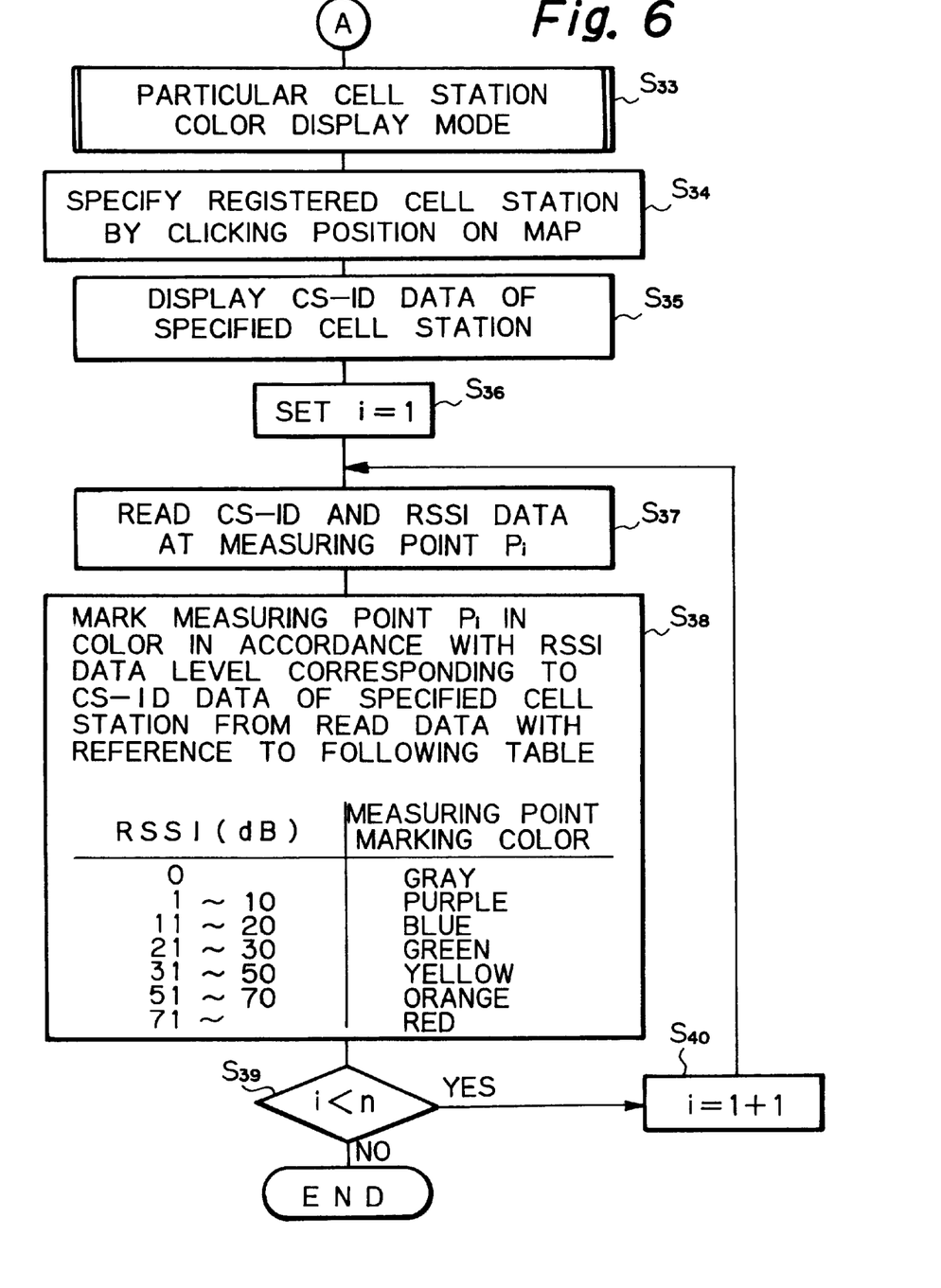
FIG. 6 is a flowchart of a process in a given cell station color display mode which is executed after electric field strength data have been measured in accordance with the flowchart shown in FIG. 3.

If it is determined at step S24 that the measuring point color display mode is the particular cell station color display mode, the flow proceeds to steps S33 through S40 illustrated in FIG. 6. In the particular cell station color display mode, the operator clicks the position of a cell station on a displayed map for specifying it at step S34, and CS-ID data associated with the specified cell station are read from the RAM 82, and displayed in the second block B2 on the screen of the display unit 10 at step S35. It should be noted that the CS-ID data associated with respective cell stations have been stored in the RAM 82 by the cell station plot mode in the measurement mode.

Then, the CPU 7 sets i to 1 (i=1) at step S36, and reads stored data at a measuring point Pi=Pl from the RAM 82 at step S37. Next, at step S38, the CPU 7 extracts RSSI data accompanied with the CS-ID data of the cell station specified at step S35 from the read data, and marks the measuring point Pl on the displayed map in a color corresponding to the level of the RSSI data. The correspondence between the RSSI level (including zero) and color is shown, for example, as a table in the block of step S35 in FIG. 6. Such a correspondence table has been previously stored in the ROM 81 (or the RAM 82). It should be noted that the "0" of the RSSI data means no CS-Id data. Thus, the CPU 7 can specify a color by referring to this correspondence table, and can mark in the specified color.

Subsequently, i<n is determined at step S39, and i is incremented by one at step S40, followed by the flow returning to step S37. Similarly, RSSI data regarding measuring points Pi (i=2, 3, . . . , n) are read from the RAM 82 and displayed in colors corresponding to the levels of the RSSI data at the point Pi on the displayed map. If it is determined at step S39 that i is not smaller than n, i.e., i=n is satisfied, the particular cell station color display mode is terminated.

Figure 7:
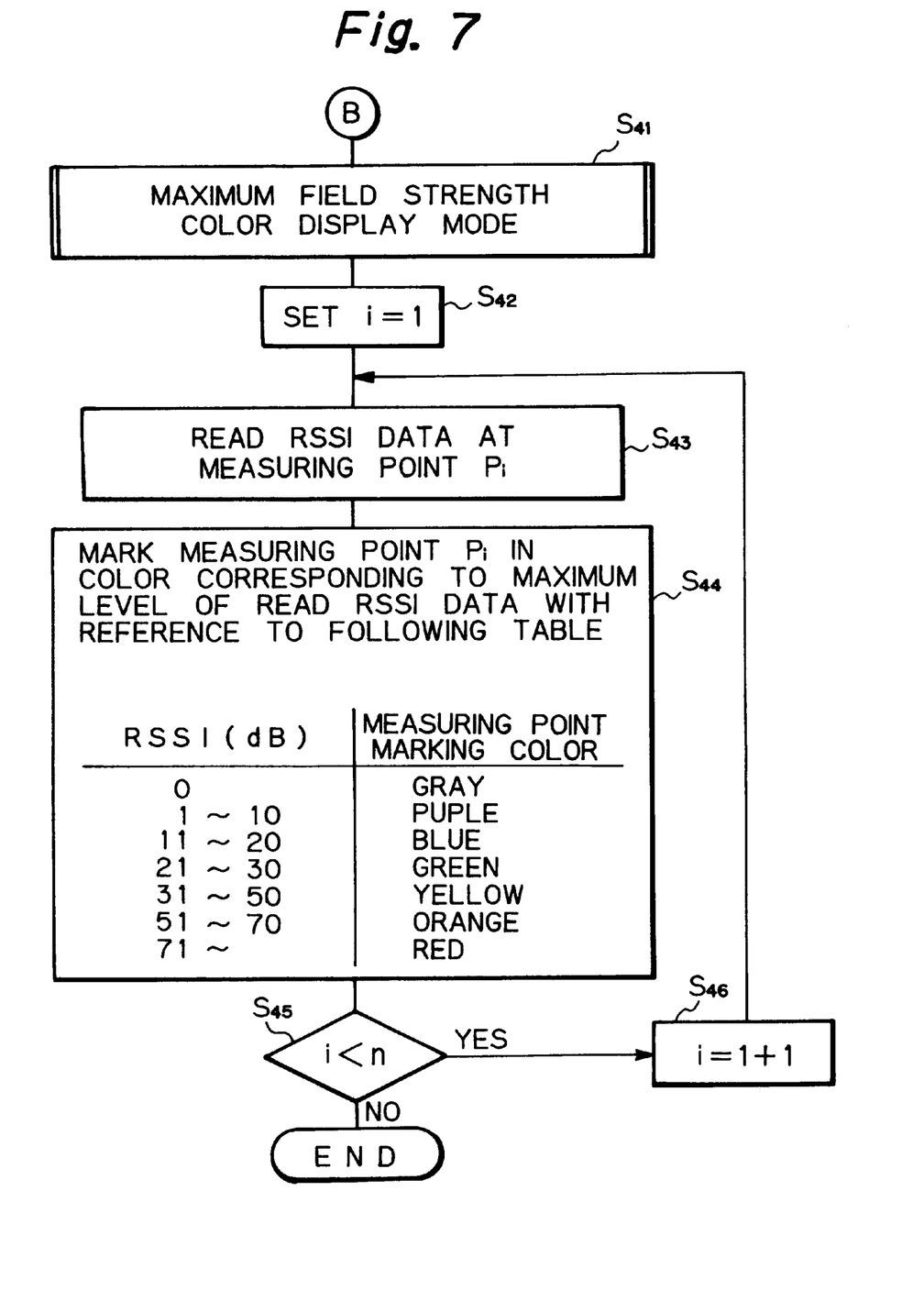
FIG. 7 is a flowchart of a process in an maximum field strength color display mode which is executed after electric field strength data have been measured in accordance with the flowchart shown in FIG. 3.

When the maximum electric field strength color display mode is currently set, the process flow goes from step S25 in FIG. 5 to step S41 in FIG. 7, and the maximum electric field strength display processing is executed as shown in FIG. 7. In this mode, the CPU 7 first sets i to 1 (i=1) at step S42, and reads all stored data (all pairs of CS-ID and RSSI data) relating to a measuring point Pi=Pl on the displayed map from the RAM 82 at step S43. Then, at step S44, a maximum value is extracted from the RSSI data read from the RAM 82, and the measuring point Pl on the map is marked in a color corresponding to the level of the maximum value. Similarly to the particular cell station color display mode and the receivable station number color display mode, the correspondence between the maximum electric field strength level (including zero) and color has been previously stored in the ROM 81 (or the RAM 82), and an example thereof is shown in the block of step S44 in FIG. 7. Thus, the CPU 7 can specify a color for a measuring point Pl by referring to the table to mark it at the point Pl.

Subsequently, the flow returns to step S43 through steps S45, S46. By repeating the processing just described, all the measuring points Pl–Pn on the displayed map are marked in color corresponding to the maximum level of the electric field strength of the signal receivable at the measuring points Pl–Pn, respectively.

In the description given above, electric field strength of radio waves transmitted from PHS cell station is measured at an arbitrary measuring location, and analyzed to display the measured CS-ID and RSSI information on the display unit. However, the present invention is not limited to apply to only the PHS but also any other system as long as radio transmission sources in the system transmit radio waves including their identification code information. In addition, in the processing flows for the respective modes, the steps may be exchanged as required.

The system as described above at any measuring location, allows for automatic and easy measurements and collection of electric field strength data of radio waves received at the measuring location together with transmission source ID data. Particularly, in the system provided with the map display function, by clicking a measuring point on an electrically displayed map by a pen or the like, which coincides with the measuring location (or the system location), the measured data associated with the measuring point can be automatically stored in the RAM, or readily retrieved and displayed, thereby significantly improving the working efficiency of the measurement.

Also, according to the present invention, the measured and collected data is processed to display the number of cell stations which transmit radio waves receivable at each measuring point, electric field strength of radio waves transmitted from a particular cell station and received at each measuring point, and a maximum electric field strength at each measuring point, in respectively corresponding colors, so that the state of a service area can be extremely easily revealed on the spot without bringing measured data back to the office or the like for analysis.

In addition, if a liquid crystal display is employed as the display unit, the present invention can be largely reduced in size. High portability is quite important for a measuring system such as the one provided by the present invention because it must be carried to a variety of field points.

It is further understood by those skilled in the art that the forgoing description are preferred embodiments of the present invention and that various changes and modifications may be made without departing from the spirit and scope of the invention.

What is claimed is:

1. A system for measuring electric field strength of radio waves transmitted from cell station and arriving at an arbitrary measuring location, comprising:

identification code detecting means for detecting cell station identification (CS-ID) codes included in respective radio waves received at a measuring location, each CS-ID code representing a cell station that transmitted the radio waves associated with the CS-ID code, respectively;

electric field strength detecting means for detecting electric field strength (RSSI) of radio waves associated with the CS-ID codes;

storage means for storing CS-ID codes and associated RSSI data detected by the identification code detecting means and the electric field strength detecting means, together with information identifying the measuring location;

display means for displaying CS-ID codes and RSSI data from the storage means on a display screen in association with information indicative of the measuring location; and control means for controlling operations of the identification code detecting means, the electric field strength detecting means, the storage means, and the display means, wherein:

the storage means has previously stored image data representing a map including the measuring location, the map being displayed on the display means;

the system is further adapted to execute a measuring point plot mode such that when a measuring point is designated on the map displayed on the display means, the control means specifies addresses in the storage means corresponding to coordinates of the designated measuring point on the map to store all sets of CS-ID data and RSSI data at the specified addresses and places a measuring point mark at the designated measuring point on the map; and the system is further adapted to execute a plot deletion mode such that when a measuring point is designated on the map displayed on the display means, the control means specifies addresses in the storage means corresponding to coordinates of the designated measuring point on the map to erase the stored CS-ID data and RSSI data therefrom and deletes the measuring point mark on the map.

2. A system according to claim 1, wherein the system is further adapted to execute a plot confirmation mode such that when a measuring point is designated on the map displayed on the display means, the control means specifies addresses in the storage means corresponding to coordinates of the designated measuring point on the map to read all the sets of CS-ID data and RSSI data from the designated addresses and controls to display the sets of the read CS-ID data and RSSI data on the display means.

3. A system according to claim 1, wherein a measuring point or a position of a cell station on the map displayed on the display means is designated by clicking on the map.

4. A system according to claim 1, wherein the display means comprises a liquid crystal display.

5. A system according to claim 1, wherein the cell stations are those of a personal handy phone system.

6. A system for measuring electric field strength of radio waves transmitted from cell stations and received at an arbitrary measuring location, comprising:

identification code detecting means for detecting cell station identification (CS-ID) codes included in respective radio waves received at a measuring location, each CS-ID code representing a cell station that transmitted the radio waves associated with the CS-ID code, respectively;

electric field strength detecting means for detecting electric field strength (RSSI) of radio waves associated with the CS-ID codes;

storage means for storing CS-ID codes and associated RSSI data detected by the identification code detecting means and the electric field strength detecting means, together with information identifying the measuring location;

display means for displaying CS-ID codes and RSSI data from the storage means on a display screen in association with information indicative of the measuring location; and control means for controlling operations of the identification code detecting means, the electric field strength detecting means, the storage means, and the display means, wherein:

the storage means has previously stored image data representing a map including the measuring location, the map being displayed on the display means;

the system is further adapted to execute a measuring point plot mode such that when a measuring point is designated on the map displayed on the display means, the control means specifies addresses in the storage means corresponding to coordinates of the designated measuring point on the map to store all sets of CS-ID data and RSSI data at the specified addresses and places a measuring point mark at the designated measuring point on the map; and the system is further adapted to execute a cell station plot mode such that when a cell station is designated on the map displayed on the display means, the control means specifies an address in the storage means corresponding to coordinates of the position of the designated cell station on the map to store CS-ID code indicative of the cell station in the specified address and places a cell station mark at the position of the cell station on the map.

7. A system according to claim 6, wherein the system is further adapted to execute a particular cell station color display mode such that when the position of a cell station is designated on the map displayed on the display means, the control means specifies an address in the storage means corresponding to the coordinates of the position of the designated cell station on coordinates of the position of the designated cell station on the map to read the CS-ID data indicative of the designated cell station therefrom, specifies addresses in the storage means corresponding to the coordinates of all the measuring points on the map on the display means to read the RSSI data therefrom, and extracts only the RSSI data paired with the read CS-ID data to mark the associated measuring points on the map in colors corresponding to the value of the RSSI data, so as to display the electric field strength of receivable radio waves transmitted from the designated cell station in the colors.

8. A system for measuring electric field strength of radio waves transmitted from cell stations and received at an arbitrary measuring location, comprising:

identification code detecting means for detecting cell station identification (CS-ID) codes included in respective radio waves received at a measuring location, each CS-ID code representing a cell station that transmitted the radio waves associated with the CS-ID code, respectively;

electric field strength detecting means for detecting electric field strength (RSSI) of radio waves associated with the CS-ID codes;

storage means for storing CS-ID codes and associated RSSI data detected by the identification code detecting means and the electric field strength detecting means, together with information identifying the measuring location;

display means for displaying CS-ID codes and RSSI data from the storage means on a display screen in association with information indicative of the measuring location; and control means for controlling operations of the identification code detecting means, the electric field strength detecting means, the storage means, and the display means, wherein:

the storage means has previously stored image data representing a map including the measuring location, the map being displayed on the display means;

the system is further adapted to execute a measuring point plot mode such that when a measuring point is designated on the map displayed on the display means, the control means specifies addresses in the storage means corresponding to coordinates of the designated measuring point on the map to store all sets of CS-ID data and RSSI data at the specified addresses and places a measuring point mark at the designated measuring point on the map; and the system is further adapted to execute a communicable cell station number color display mode such that the control means specifies addresses in the storage means corresponding to coordinates of all the measuring points on the map on the display means to read the CS-ID data stored therein, counts the number of the read CS-ID data for each measuring point, and marks the measuring points on the maps in colors corresponding to counted values, respectively, so as to display the numbers of communicable cell stations at the measuring points in the colors.

9. A system for measuring electric field strength of radio waves transmitted from cell stations and received at an arbitrary measuring location, comprising:

identification code detecting means for detecting cell station identification (CS-ID) codes included in respective radio waves received at a measuring location, each CS-ID code representing a cell station that transmitted the radio waves associated with the CS-ID code, respectively;

electric field strength detecting means for detecting electric field strength (RSSI) of radio waves associated with the CS-ID codes;

storage means for storing CS-ID codes and associated RSSI data detected by the identification code detecting means and the electric field strength detecting means, together with information identifying the measuring location;

display means for displaying CS-ID codes and RSSI data from the storage means on a display screen in association with information indicative of the measuring location; and control means for controlling operations of the identification code detecting means, the electric field strength detecting means, the storage means, and the display means, wherein:

the storage means has previously stored image data representing a map including the measuring location, the map being displayed on the display means;

the system is further adapted to execute a measuring point plot mode such that when a measuring point is designated on the map displayed on the display means, the control means specifies addresses in the storage means corresponding to coordinates of the designated measuring point on the map to store all sets of CS-ID data and RSSI data at the specified addresses and places a measuring point mark at the designated measuring point on the map; and the system is further adapted to execute a maximum electric field strength color display mode such that the control means specifies addresses in the storage means corresponding to the coordinates of all the measuring points on the map on the display means to read the RSSI data stored therein, and detects a maximum value of the read RSSI data for each measuring point, and marks the associated measuring points on the map in colors corresponding to the detected maximum values, so as to display the maximum electric field strength at the measuring points in the colors.

10. A method of measuring electrical field strength of radio waves transmitted from cell stations and received at an arbitrary measuring location, comprising the steps of:

detecting cell station identification (CS-ID) codes included in respective radio waves received at a measuring location, the CS-ID codes representing cell stations which transmit the radio waves, respectively;

detecting electric field strength (RSSI) of the received respective radio waves;

storing all sets of the CS-ID data and associated RSSI data detected at each of measuring locations, in addresses corresponding to the measuring location of storage means having previously stored image data representing a map including the measuring location;

displaying all sets of the CS-ID data and RSSI data read from the storage means on a display means in association with information indicative of the measuring location;

reading the image data from the storage means and displaying the map on the display means;

plotting a measuring point by:
setting a measuring point plot mode,
designating a measuring point on the map displayed on the display means, and
placing a measuring point mark at the designated measuring point on the map,
wherein the steps of storing the CS-ID data and the RSSI data and displaying them are executed when the measuring point is designated on the map; and deleting a measuring point by:
setting a plot deletion mode;
designating a measuring point on the map displayed on the display means;
specifying addresses in the storage means corresponding to coordinates of the designated measuring point on the map to erase the stored CS-ID data and RSSI data therefrom; and
deleting the measuring point mark on the map.

11. A method according to claim 10, further including confirming a plot by:

setting a plot confirmation mode;
designating a measuring point on the map displayed on the display means;
specifying addresses in the storage means corresponding to coordinates of the designated measuring point on the map to read all the sets of CS-ID data and RSSI data from the designated addresses; and
displaying the sets of the read CS-ID data and RSSI data on the display means.

12. A method according to claim 10, wherein a measuring point or a position of a cell station on the map displayed on the display means is designated by clicking on the map.

13. A method according to claim 10, wherein the display means comprises a liquid crystal display.

14. A method according to claim 10, wherein the cell stations are those of a personal handy phone system.

15. A method of measuring electrical field strength of radio waves transmitted from cell stations and arriving at an arbitrary measuring location, comprising the steps of:

detecting cell station identification codes (CS-ID) included in respective radio waves received at a measuring location, the CS-ID codes representing cell stations which transmit the radio waves, respectively;

detecting electric field strength (RSSI) of the received respective radio waves;

storing all sets of the CS-ID data and associated RSSI data detected at each of measuring locations, in addresses corresponding to the measuring location of storage means having previously stored image data representing a map including the measuring location; and displaying all sets of the CS-ID data and RSSI data read from the storage means on a display means in association with information indicative of the measuring location;

reading the image data from the storage means and displaying the map on the display means;

plotting a measuring point by:
setting a measuring point plot mode,
designating a measuring point on the map displayed on the display means, and
placing a measuring point mark at the designated measuring point on the map, plotting a cell station by:
setting a cell station plot mode;
designating a cell station on the map displayed on the display means;
specifying an address in the storage means corresponding to coordinates of the position of the designated cell station on the map to store CS-ID code indicative of the cell station in the specified address; and
placing a cell station mark at the position of the cell station on the map.

16. A method according to claim 15, further including the steps of:

setting a particular cell station color display mode;

designating a cell station on the map displayed on the display means;

specifying an address in the storage means corresponding to the coordinates of the position of the designated cell station on the map to read the CS-ID data indicative of the designated cell station therefrom;

specifying addresses in the storage means corresponding to the coordinates of all the measuring points on the map on the display means to read the RSSI data therefrom;

extracting only the RSSI data paired with the read CS-ID data; and marking the associated measuring points on the map in colors corresponding to the value of the extracted RSSI data, so as to display the electric field strength of receivable radio waves transmitted from the designated cell station in the colors.

17. A method of measuring electrical field strength of radio waves transmitted from cell stations and arriving at an arbitrary measuring location, comprising the steps of:

detecting cell station identification codes (CS-ID) included in respective radio waves received at a measuring location, the CS-ID codes representing cell stations which transmit the radio waves, respectively;

detecting electric field strength (RSSI) of the received respective radio waves:

storing all sets of the CS-ID data and associated RSSI data detected at each of measuring locations, in addresses corresponding to the measuring location of storage means having previously stored image data representing a map including the measuring location; and displaying all sets of the CS-ID data and RSSI data read from the storage means on a display means in association with information indicative of the measuring location;

reading the image data from the storage means and displaying the map on the display means;

plotting a measuring point by:
setting a measuring point plot mode,
designating a measuring point on the map displayed on the display means, and
placing a measuring point mark at the designated measuring point on the map, displaying numbers of communicable cell stations by:
setting a communicable cell station number color display mode;
specifying addresses in the storage means corresponding to coordinates of all the measuring points on the map on the display means to read the CS-ID data stored therein;
counting the number of the read CS-ID data for each measuring point; and
marking the measuring point on the maps in colors corresponding to counted values, respectively, so as to display the numbers of communicable cell stations at the measuring points in the colors.

18. A method of measuring electrical field strength of radio waves transmitted from cell stations and arriving at an arbitrary measuring location, comprising the steps of:

detecting cell station identification codes (CS-ID) included in respective radio waves received at a measuring location, the CS-ID codes representing cell stations which transmit the radio waves, respectively;

detecting electric field strength (RSSI) of the received respective radio waves;

storing all sets of the CS-ID data and associated RSSI data detected at each of measuring locations, in addresses corresponding to the measuring location of storage means having previously stored image data representing a map including the measuring location; and displaying all sets of the CS-ID data and RSSI data read from the storage means on a display means in association with information indicative of the measuring location;

reading the image data from the storage means and displaying the map on the display means;

plotting a measuring point by:
setting a measuring point plot mode,
designating a measuring point on the map displayed on the display means, and
placing a measuring point mark at the designated measuring point on the map, plotting maximum electric field strength by:
setting a maximum electric field strength color display mode;
specifying addresses in the storage means corresponding to coordinates of all the measuring points on the map on the display means to read the RSSI data stored therein;
detecting a maximum value of the read RSSI data for each measuring point; and
marking the associated measuring points on the map in colors corresponding to the detected maximum values, so as to display the maximum electric field strength at the measuring points in the colors.

* * * * *